United States Patent [19]

Seki et al.

[11] Patent Number: 4,893,251

[45] Date of Patent: Jan. 9, 1990

[54] METHOD OF GENERATING CUTTING PATH OF COMPLEX CURVED SURFACE

[75] Inventors: Masaki Seki; Koji Samukawa, both of Tokyo, Japan

[73] Assignee: Fanuc Ltd., Tokyo, Japan

[21] Appl. No.: 171,870

[22] PCT Filed: Jul. 7, 1987

[86] PCT No.: PCT/JP87/00477

§ 371 Date: Mar. 7, 1988

§ 102(e) Date: Mar. 7, 1988

[87] PCT Pub. No.: WO88/00367

PCT Pub. Date: Jan. 4, 1988

[30] Foreign Application Priority Data

Jul. 9, 1986 [JP] Japan ................... 61-161518

[51] Int. Cl.$^4$ ............................................. G05B 19/403
[52] U.S. Cl. .............................. 364/474.29; 318/570
[58] Field of Search ................. 364/474.29, 474.22, 364/474.25, 474.31, 191–193; 318/568, 570, 528.1

[56] References Cited

U.S. PATENT DOCUMENTS 3,882,304 5/1975 Walters ................... 364/474.05 X
4,491,906 1/1985 Kishi et al. ........................ 364/191
4,523,270 6/1985 Kishi et al. ................ 364/474.29 X
4,546,427 10/1985 Kishi et al. ................ 364/474.29 X
4,589,062 5/1986 Kishi et al. ....................... 364/474.29
4,755,926 7/1988 Kishi et al. ................ 364/474.29 X
4,755,927 7/1988 Kishi et al. ................ 364/474.29 X Primary Examiner—Joseph Ruggiero
Attorney, Agent, or Firm—Staas & Halsey

[57] ABSTRACT

Data for specifying each three-dimensional curved surface (12a, 12b, 12c) constituting a complex curved surface (11, FIG. 1) are inputted, and one curve (CV) on the X-Y plane is specified. The curve CV comprises two or more elements (CV1-CV4). The complex curved surface (11) is intersected by planes or sections (SSi) extending from lines of reference (elements $CV_1$, $CV_2$ . . . ) on the X-T plane that are i-th (i=1, 2, . . . ) elements ($CV_2$, $CV_2$ . . . ) (CVi) in the clockwise or counter-clockwise direction among a number of elements constituting the curve (CV). Thereafter, a cutting path is generated by adopting a path (SC1→SC2→SC3→SC4) for moving a tool along the section curves formed by intersections between each plane or section SSi and surfaces of the complex curved surface, each section curve corresponding to the above-mentioned elements in the order of the elements.

5 Claims, 5 Drawing Sheets

METHOD OF GENERATING CUTTING PATH OF COMPLEX CURVED SURFACE

BACKGROUND OF THE INVENTION

1. Technical Field of the Invention

This invention relates to a method of generating a cutting path on a complex curved surface and, more particularly, to a cutting path generating method through which a complex curved surface can be cut along any path.

2. Description of the Related Art

A curved surface of a three-dimensional metal mold or the like on a design drawing is generally expressed by a plurality of section curves, but no profile data is shown for the shape of the area lying between a certain section curve and the next adjacent section curve. In numerically controlled machining it is essential that machining be carried out so as to smoothly connect these two section curves despite the fact that the profile between them is not given. In other words, this means that machining must be performed by generating the curved surface between the two section curves from such data as that indicative of the section curves, storing on an NC tape the data concerning the generated curved surface, and carrying out machining in accordance with commands from the NC tape. To this end, there has been developed and put into practical use a method comprising generating a plurality of intermediate sections in accordance with predetermined rules from data specifying several sections and section curves of a three-dimensional curved body, finding a section curve (intermediate section curve) on the curved body based on the intermediate sections, and generating a curved surface of the three-dimensional body based on the plurality of generated intermediate section curves. (For example, see the specification of U.S. Pat. No. 4,491,906.) This method is useful in generating a smooth curved surface from section data.

Recently, a method of creating a complex curved surface obtained by combining two or more three-dimensional curved surfaces has also been proposed. For example, refer to U.S. Ser. No. 928,288 (filing date: Oct. 23, 1986, U.S. Pat. No. 4,825,377, entitled "Complex Curved Surface Creation Method"). The proposed method of creating complex curved surfaces includes:

(i) previously inputting data specifying each of the three-dimensional curved surfaces 12a, 12b, 12c constituting a complex curved surface 11 (see FIG. 5), inputting data specifying one line of intersection CL1 (see FIG. 6) corresponding to a predetermined plane (e.g. an X-Y plane) as well as a rule (distance d, Vx, VY, etc.) for specifying a number of lines of intersection CLi (i=1, 2, ...);

(ii) finding section curves 13 (the set of 13a, 13b, 13c) obtained when the complex curved surface 11 is cut by a section plane SSi having an i-th line of intersection CLi, among the number of lines of intersection, (iii) and thereafter obtaining, in a similar manner, section curves based on sections corresponding to respective ones of the lines of intersection, and generating a complex curved surface by assembling the section curves.

When NC data for curved surface machining are generated using the curved surface created by the foregoing conventional method, the cutting path of the tool is one which will cause the tool to move along the obtained section curves in the order of these section curves.

More specifically, the conventional cutting path is determined in such a manner that the curved surface is machined by repeating one-way cutting or two-way cutting along the section curves that have been obtained.

Accordingly, when it is desired to perform edge cutting by moving the tool along the contour of a complex curved surface (i.e. in the directions of the solid arrows in FIG. 5), such cutting is impossible with the conventional method.

With the conventional method, moreover, surface machining generally cannot be performed by moving a tool along an arbitrary cutting path. For example, cutting cannot be performed by moving a tool successively along a number of closed paths similar to the contour lines of a complex curved surface.

SUMMARY OF THE INVENTION

Accordingly, an object of the present invention is to provide a cutting path generating method through which a complex curved surface can be subjected to edging machining and machining can be performed along an arbitrary cutting path.

The present invention relates to a method of generating a cutting path for a complex curved surface composed of a combination of at least two three-dimensional curved surfaces. The cutting path generating method includes a step of inputting data corresponding to each of the three-dimensional curved surfaces, and specifying one curve on an XY plane, (the curve comprising two or more elements, where an element refers to a line segment or a circular arc), a step of finding section curves obtained when the complex curved surface is cut by sections having lines of intersection in the XY plane that are i-th (i=1, 2, ...) elements in a predetermined direction among a number of elements constituting the curve, and a step of generating, as a cutting path, a path for moving a tool along the section curves corresponding to the above-mentioned elements in the order of the elements.

DESCRIPTION OF THE PREFERRED EMBODIMENT

Figure 1:
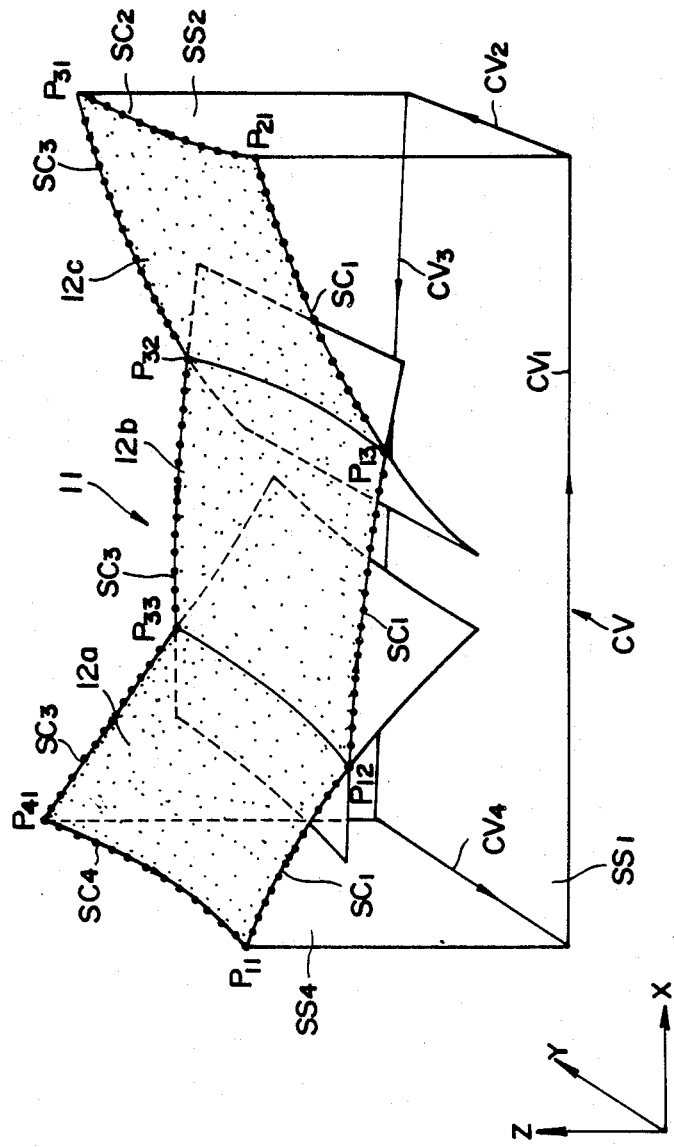
FIG. 1 is a view for describing the cutting path generating method according to the present invention.

FIG. 1 is a view for describing the cutting path generating method according to the present invention. Numeral 11 denotes a complex curved surface, and numerals 12a, 12b and 12c denote three-dimensional curved surfaces constituting the complex curved surface. CV represents a curve on the X-Y plane, CV1–CV4 denote elements (line segments or circular arcs) constituting the curve CV, SS1–SS4 denote sections (planes) intersecting the complex curved surfaces, and SC1–SC4 denote resulting section curves.

Data for specifying each of the three-dimensional curved surfaces 12a, 12b, 12c constituting the complex curved surface 11 are inputted, and one curve CV on the X-Y plane is specified, the curve CV comprising two or more elements CV1-CV4. The complex curved surface 11 is intersected by sections SSi having lines of intersection as references in the X-Y plane that are i-th (i=1, 2, ...) elements CVi in the clockwise or counterclockwise direction among a number of elements constituting the curve CV. The resulting section curves SC1-SC4 are thereby found. Thereafter, a cutting path is generated by adopting a path SC1→SC2→SC3→SC4 for moving a tool along the derived section curves corresponding to the above-mentioned elements in the order of the elements.

Figure 2:
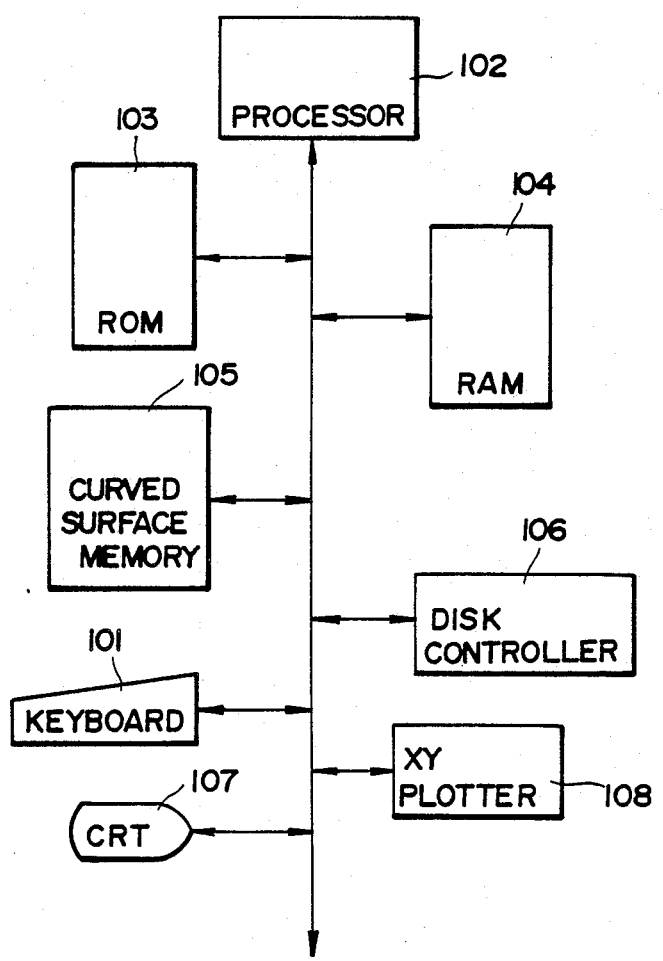
FIG. 2 is a block diagram of an automatic programming apparatus for practicing the present invention.
Figure 3:
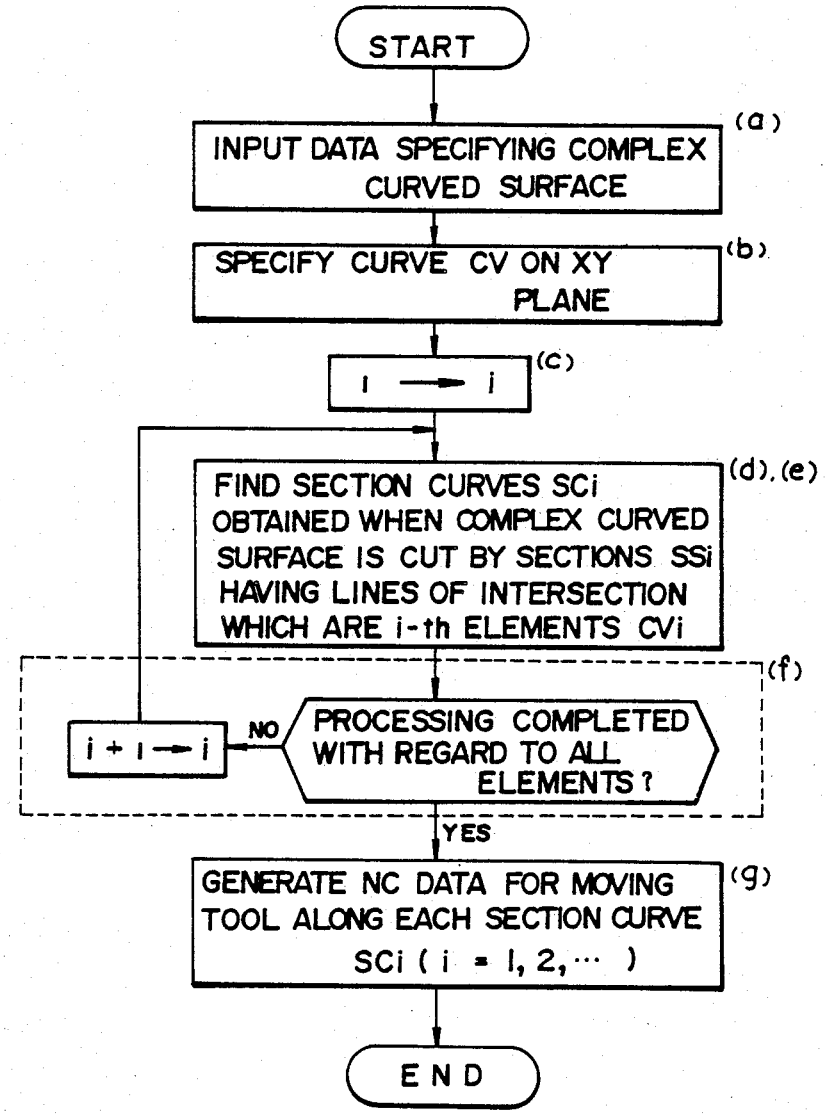
FIG. 3 is a flowchart of processing according to the invention.

FIG. 2 is a block diagram of an automatic programming apparatus for practicing the method of the invention, and FIG. 3 is a flowchart of processing.

In FIG. 2, numeral 101 denotes a keyboard for data input; 102 a processor; 103 a ROM storing a control program; 104 a RAM; 105 a curved surface memory for storing curved surface data indicative of a generated complex curved surface as well as NC program data for curved surface machining; 106 a disc controller for outputting the curved surface data and NC data to a floppy disc; 107 a graphics display unit (CRT); and 108 an X-Y plotter for outputting a graphic representative of the curved surface.

Processing for generating a cutting path according to the present invention will now be described with reference to FIGS. 1 through 3.

(a) First, data are entered from the keyboard 101 specifying first, second and third three-dimensional curved surfaces 12a, 12b and 12c, respectively, which constitute the complex curved surface 11 (see FIG. 1). These data are stored in the RAM 104. Refer to the specification of the aforementioned U.S. Pat. No. 4,491,906 with regard to data specifying a curved surface.

(b) Next, data are inputted from the keyboard 101 for specifying the sections (planes) SS1–SS4 intersecting and thereby sectioning the complex curved surface 11. More specifically, the single curve CV on the X-Y plane is specified, which comprises the two or more elements CV1–CV4, where an element refers to a line segment or a circular arc as a reference for each of the sections SS1–SS4. By way of example, the curve CV is approximated by a number of line segments and circular arcs obtained by projecting a contour line of the complex curved surface 11 onto the X-Y plane.

(c) When these data have been inputted, the processor 102 performs the operation 1→i.

(d) The next step is to find section curves which result when the first, second and third curved surfaces 12a, 12b, 12c are cut by sections SSi whose lines of intersection with the X-Y plane are i-th elements CVi as seen in a predetermined direction (e.g. counter-clockwise) among the number of elements constituting the curve CV. A section curve is found as a discrete series of points by a known technique already proposed as International Application No. PCT/JP86/00470 (filing date: Sept. 12, 1986, entitled "Complex Curved Surface Creation Method").

(e) Among the section curves, the uppermost series of points is stored as a section curve SCi of the complex curved surface 11. It should be noted that a series of points specifying the section curve SC1 corresponding to the element CV1 is P11 ... P12 ... P13 ... P21.

(f) Thereafter, i is updated by the operation i+1→i and the processing from step (d) to (f) is repeated to finally obtain, as a series of points, the section curves (SC1-SC4) corresponding to all of the elements (CV1-CV4) constituting the curve CV. If the series of points constituting the corresponding section curves are arranged in the order of the elements, the series of points P11 ... P12 ... P13 ... P21 ... P31 ... P32 ... P33 ... P41 ... P11 will define the contour of the complex curved surface 11.

(g) Finally, NC data for moving a tool along the above-mentioned series of points are generated. It should be noted that edge cutting can be carried out by moving the tool along the contour of the complex curved surface by means of these NC data.

Figure 4:
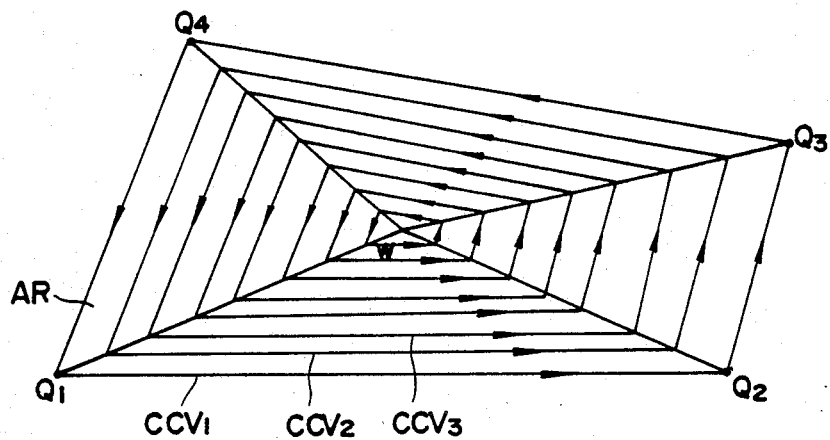
FIG. 4 is an example of another cutting path according to the present invention.
Figure 5:
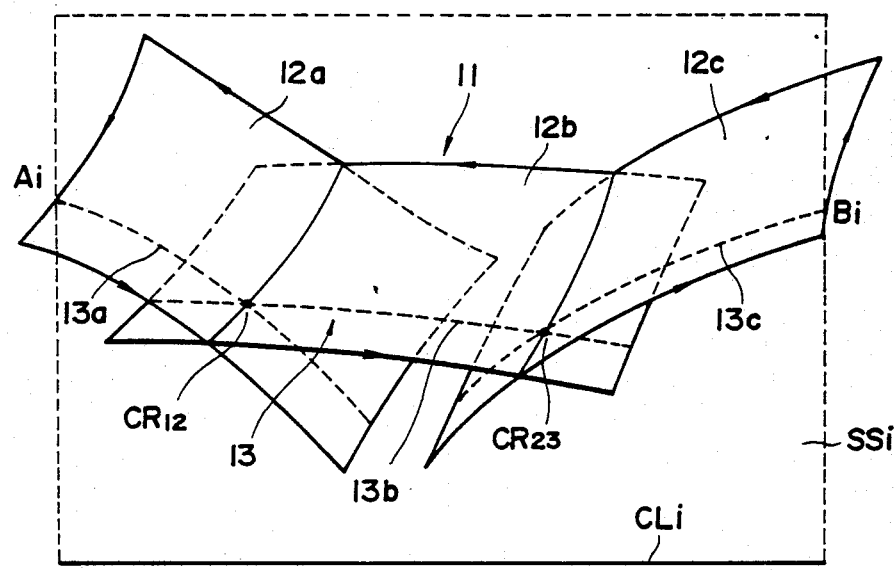
FIGS. 5 and 6 are views for describing the conventional method.
Figure 6:
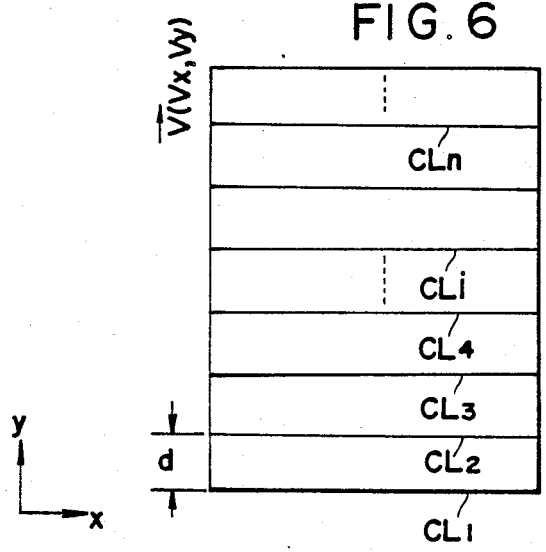

The foregoing relates to a case where a tool is moved along the contour of the complex curved surface. However, it is also possible to generate a cutting path in such a manner that a complex curved surface will be cut by moving the tool successively in spiral fashion along closed paths CCV1, CCV2, ..., shown in FIG. 4, which are projections in the XY plane. In order to generate such a cutting path, data specifying the outermost closed path CCV1, and a number of partitions N, are inputted at step (b). For example, the centroid W of an area AR bounded by the curve CCV1 is calculated, line segments connecting the centroid with each of the apices $Q_i$ are divided equally by N, the closed curves CCVi (i=1, 2, ...) are generated by successively connecting corresponding ones of the partitioning points, and processing from step (c) onward is executed with respect to each closed curve, thereby generating paths for machining the complex curved surface.

In accordance with the present invention, the arrangement is such as to specify one curve on a predetermined plane, the curve comprising two or more elements, find section curves obtained when the complex curved surface is cut by sections having lines of intersection in the predetermined plane that are the elements constituting the curve, and adopt, as a cutting path, a path for moving a tool along the section curves corresponding to the above-mentioned elements in the order of the elements. As a result, it is possible to perform edge-machining of a complex curved surface and to carry out machining along any desired cutting path.

We claim:

1. A method of generating a cutting path for a complex curved surface having at least two three-dimensional curved surfaces, said method comprising the steps of:

inputting data corresponding to each of the three-dimensional curved surfaces, and specifying one curve in a predetermined plane, said specified curve comprising two or more elements, each element comprising one of a line segment and a circular arc;

finding section curves of the complex curved surface by dividing the complex curved surface into sections defined by planes, each of the planes corresponding to one of the elements of said specified curve in said predetermined plane that are i-th (i=1, 2, ...) elements in a predetermined direction among the number of elements constituting said specified curve; and generating as a cutting path, a path for moving a tool along said section curves corresponding to the elements in said predetermined order of the elements.

2. A method of generating a cutting path for a complex curved surface according to claim 1, wherein said step of inputting data and specifying one curve comprises generating said specified curve by projecting a contour line of the complex curved surface onto said predetermined plane.

3. A method of generating a cutting path for a complex curved surface according to claim 1, further including the steps of:
 projecting a contour line of the complex curved surface onto said predetermined plane and finding a centroid of an area having apices and bounded by the projected contour line;
 forming line segments connecting said centroid with each of the apices of the bounded area and equally dividing the line segments by a partitioning number N, the divided line segments having partitioning points; and
 said step of inputting data and specifying one curve includes successively connecting corresponding ones of the partitioning points from each of the line segments and forming said specified curve.

4. A method of producing at tool cutting path for intersecting three-dimensional curved surfaces, comprising the steps of:
 specifying a closed curve in a plane having a predetermined position apart from the three-dimensional curved surfaces;
 projecting sections through the closed curve perpendicular to the plane intersecting the three-dimensional curved surfaces and producing section curves; and
 producing the cutting path from the section curves.

5. An apparatus for producing a tool cutting path for intersecting three-dimensional curved surfaces, comprising:
 closed surface specifying means for specifying a closed curve in a plane having a predetermined position apart from the three-dimensional curved surfaces;
 projecting means for projecting sections through the closed curve perpendicular to the plane intersecting the three-dimensional curved surfaces and producing section curves; and
 path means for producing the cutting path from the section curves.

* * * * *